United States Patent

[11] 3,542,486

| [72] | Inventors | David M. Kercher;<br>Armando J. Quinones; Eugene F. Adiutori,<br>Cincinnati, Ohio |
|---|---|---|
| [21] | Appl. No. | 763,423 |
| [22] | Filed | Sept. 27, 1968 |
| [45] | Patented | Nov. 24, 1970 |
| [73] | Assignee | General Electric Company<br>a corporation of New York |

[54] FILM COOLING OF STRUCTURAL MEMBERS IN GAS TURBINE ENGINES
9 Claims, 5 Drawing Figs.

| [52] | U.S. Cl. | 416/90,<br>416/97, 415/115 |
|---|---|---|
| [51] | Int. Cl. | F01d 5/08 |
| [50] | Field of Search | 416/90, 97;<br>415/115 |

[56] References Cited
UNITED STATES PATENTS

| 3,301,526 | 1/1967 | Chamberlain | 416/90 |
| 3,388,888 | 6/1968 | Kercher et al | 415/115 |

Primary Examiner—Samuel Feinberg
Attorneys—Derek P. Lawrence, Lee H. Sachs, Oscar B. Waddell, Frank L. Neuhauser and Loren W. Peters ABSTRACT: A structural member, having an external surface exposed to a high temperature source and varied static pressures, is provided with a common plenum chamber for containment of a cooling media, a plurality of passages of generally uniform cross section to deliver the cooling media from the chamber to the higher pressure portion of the external surface and a plurality of passageways of nonuniform cross section to deliver the cooling media to the low pressure portion of the external surface for effective and efficient film cooling of the member. The nonuniform passageways are formed with a flow rate metering portion adjacent the plenum chamber and a diffuser portion adjacent the external surface.

Patented Nov. 24, 1970
3,542,486
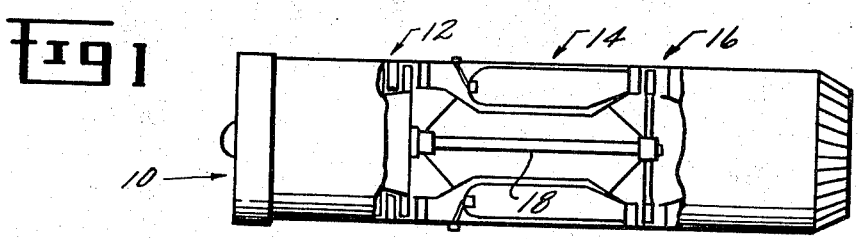
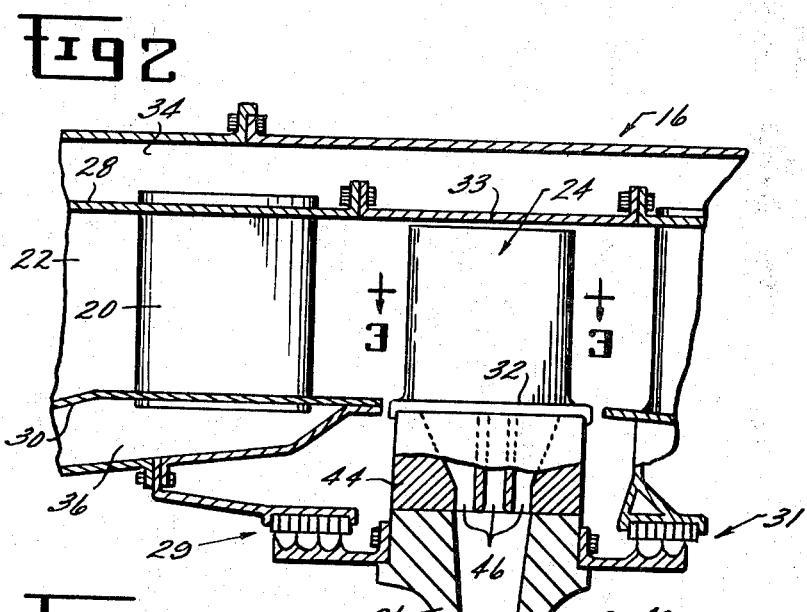
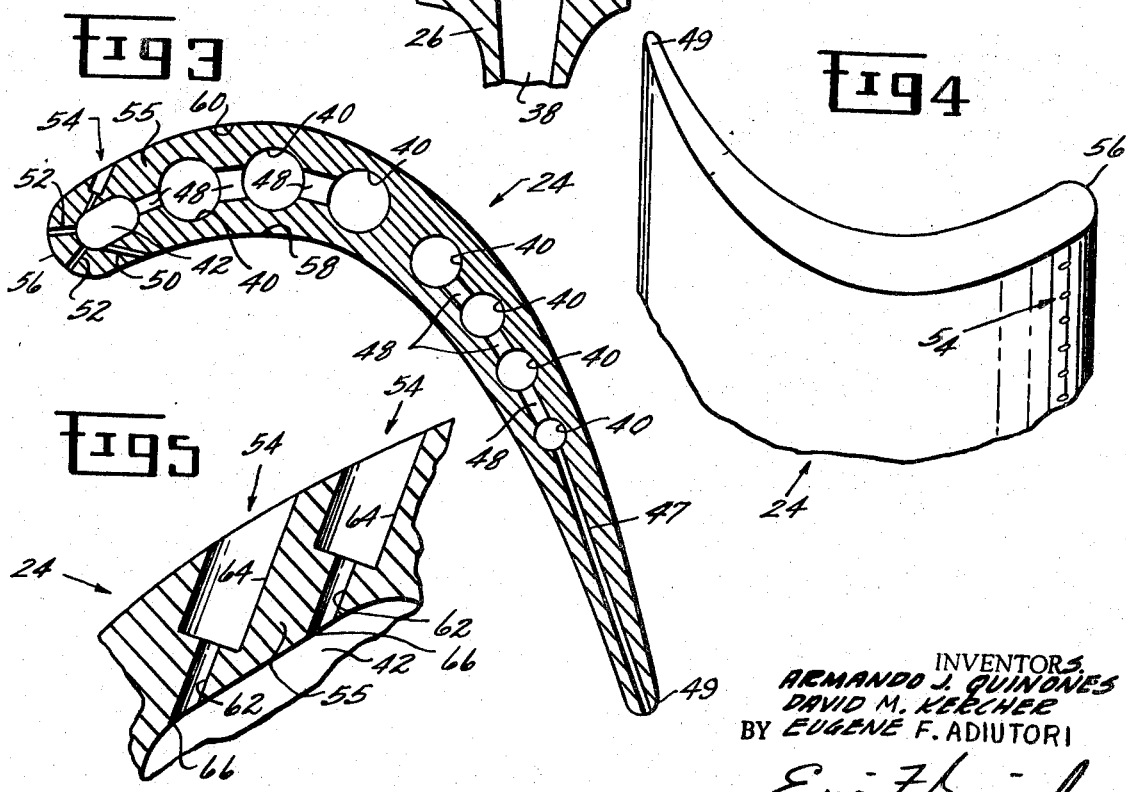
INVENTORS
ARMANDO J. QUINONES
DAVID M. KERCHER
BY EUGENE F. ADIUTORI
Erwin F. Herring Jr.
ATTORNEY

FILM COOLING OF STRUCTURAL MEMBERS IN GAS TURBINE ENGINES

This invention relates to gas turbine engines and, more particularly, to an improved cooling arrangement for use in such engines.

It is well known that the efficiency of a gas turbine engine may be increased by increasing the turbine inlet temperature of the hot gas stream. Such temperature is generally limited by the capability of the turbine blade and other structural members exposed to the hot gas stream to withstand the elevated temperatures without deleterious effect. In recent years, the introduction of greatly improved materials has enabled certain increases in the turbine inlet temperature of the hot gas stream and, hence, higher engine efficiencies. However, even with improved materials technology, the high stresses encountered by structural members exposed to the hot gas stream, particularly the turbine blades, have proved to be a problem unless some effective cooling means is provided. In some gas turbine engines the use of a combination of convection and film cooling has been found to be highly effective and generally quite practical. To provide film cooling, generally, passageways are formed in the skin or sidewalls of the member so as to communicate an interior cavity or plenum with the surface of the member exposed to the high temperature source or hot gas stream. A relatively cool pressurized fluid or other cooling media is then ducted to the interior cavity and through the side wall passageways to provide a protective or insulating film on the exterior surface of the member. For such film cooling to be efficient or effective, however, it is essential that the cooling media be accurately metered and its escape velocity accurately controlled. Where a common interior cavity or plenum is utilized to supply coolant to exterior surfaces having different static pressures acting thereagainst, such as the concave and convex surfaces of a turbine blade, volume metering, coolant escape or efflux velocity and, hence, optimum coolant efficiency or effectiveness have been difficult to achieve.

This invention then is concerned with a novel coolant passageway construction which overcomes the above-mentioned problem in an efficient and economical manner.

Accordingly, a primary object of this invention is to provide coolant passageway means for delivery of a film cooling media to the exterior surface of a structural member subjected to varied static pressures in a manner which enables efficient film cooling of the external surface.

This and other objects, which will become apparent upon reading the following description of the preferred embodiments, are fulfilled by the present invention wherein a plenum chamber containing a cooling media or fluid is placed in communication with the external surface of a structural member, having varied static pressures acting thereagainst, by means whereby the cooling media is delivered to the external surface in a manner producing high film cooling effectiveness The means for delivery of the cooling media to the external surface having the lower static pressure acting thereagainst includes a first portion adjacent the plenum chamber for volumetric metering of the cooling media and a second enlarged portion for regulating the efflux velocity of the cooling media.

While the specification concludes with claims particularly pointing out and distinctly claiming the subject matter of this invention, it is believed the invention will be better understood upon reading the following description of the preferred embodiments in connection with the accompanying drawing, wherein:

FIG. 1 is an elevational view, in partial section, diagrammatically showing a gas turbine engine within which the present invention may be practiced;

FIG. 2 is a fragmentary longitudinal section, drawn to an enlarged scale, illustrating the turbine portion of the gas turbine engine of FIG. 1;

FIG. 3 is a cross-sectional view taken along line 3–3 of FIG. 2, drawn to an enlarged scale and showing one embodiment of this invention;

FIG. 4 is a perspective view of turbine blade of FIG. 2; and

FIG. 5 is a partial cross-sectional view, drawn to an enlarged scale, showing a variation of the turbine blade of FIG. 3.

Like reference numerals will be used to refer to like parts throughout the following description of the preferred embodiments.

With reference to FIG. 1 of the drawing, a gas turbine engine has been shown at 10 as comprising a compressor 12, a suitable combustor 14 and turbomachinery 16 adapted to be rotatably driven by a hot gas produced in a well known manner in the combustor 14. The turbomachinery 16 is drivingly connected to the compressor 12 through a suitable shaft 18.

In FIG. 2, a portion of the turbine 16 has been shown in greater detail as including a circumferential row of turbine nozzle vanes 20, located downstream of the combustor 14, adapted to direct the hot gas stream contained within passage 22 to a plurality of turbine blades 24 secured to and extending generally radially from a turbine rotor 26.

The hot gas flow path or passage 22 through the turbine portion 16 of the engine has been shown as being defined by annular liners 28, 30, the vanes 20, a platform portion 32 formed on each blade 24, and a suitable annular shroud 33 adjacent the outer radial ends of the blades 24. Seals, as at 29 and 31 may be provided to reduce hot gas leakage from the passage 22.

Suitable means for delivery of a coolant fluid to the nozzle vanes 20 may be provided, such as passageways 34, 36, which are defined, in part, by the liners 28, 30 and communicate with a suitable source of coolant fluid, such as the compressor 12.

As best shown in FIG. 2, at least one substantially radially extending passage or chamber 38 is provided in the turbine rotor 26 for delivery of a suitable cooling media, preferably extracted from the compressor 12, to each blade 24. Each blade 24 includes a root portion 44 which is adapted to engage the rotor 26 in a well known manner for securement thereto. As best shown in FIGS. 2 and 3, at least one radially extending passage 46 is formed through each root portion 44 to communicate a plurality of plenum chambers 40, 42, formed in the portion of the blade projecting into the hot gas stream flow path 22, with the cooling media contained within rotor passage 38.

Although the invention has and will hereinafter be described in connection with the turbine blades 24, it should be understood that this invention may be employed in any structural member having a surface subjected to different static pressures and which is to be film cooled using a cooling media from a common plenum. For example, the invention may be effectively employed in the nozzle vanes 20, compressor blades, compressor vanes, static structural members or the like.

The hot gas stream generated in the combustor 14 flows through the passage 22 and is directed by the nozzle vanes 20 toward the blades 24 so as to drive the turbine rotor 26. In driving the rotor, the blades 24 are subjected to substantial stresses, due in part to centrifugal forces resulting from the high rate of rotation, the aerodynamic loading and high temperature environment. To the end of increasing the capability of the blade 24 or other structural members exposed to the hot gas stream to withstand such environment without deterioration, the improved cooling means, as best shown in FIGS. 3, 4 and 5 are provided.

Referring to the embodiment of FIG. 3, the plenum chambers 40, 42 extend substantially radially within the blade 24. Chordwise extending passages 48 may be provided for delivery of cooling fluid to the plenum chambers 40, 42 which are not in direct communication with passages 46. A plurality of suitable chordwise extending passages 47 communicating with one of the chambers 40 may be provided for convection cooling of the blade trailing edge 49. The chordwise interconnect passages 48 are preferably sized so as to deliver a preestablished flow rate of cooling media to the receiving chamber, establish a proper pressure in the receiving chamber, and impinge the cooling media on the chamber walls of the receiving chamber so as to create a high convection heat transfer coefficient.

With continued reference to FIG. 3, a plurality of coolant efflux holes or passages 50, 52 and 54 are provided through the blade skin or sidewall 55 at and adjacent to the blade leading edge 56 to communicate the leading edge plenum chamber 42 with the blade exterior surface to provide a film of cooling fluid which attached itself to the exterior surface of the blade and is effective to protect the blade from the high temperatures of the hot gas stream. The passages 50, 54 are preferably formed at an acute angle relative to the concave external surface 58 and convex external surface 60, respectively, to provide increased internal convection cooling by increasing the surface area of such passages and to discharge the cooling fluid at an attitude which enables the coolant to more readily attach itself to such external surfaces. The passages 50, 52 and 54 are preferably arranged in radial rows, which traverse the surfaces to be cooled as shown in FIG. 4, although it should be understood that such arrangement may be varied and that more or less than the number of radial rows shown may be utilized.

As will be understood by those skilled in the art, in operation, the cooling fluid emerging from passages 50 and 52 must overcome a higher static pressure than fluid emerging from passage 54 and the pressure within common plenum 42 must be greater than the highest such static pressure to be overcome.

Additionally, it has been found that in order to have efficient and effective film cooling, especially of the low pressure convex surface 60 of the blade, the cooling fluid must emerge from the leading edge cooling holes 50, 52 and 54 at a predetermined velocity and flow rate to have a high film effectiveness, i.e., so that the cooling fluid will spread over and attach to a wide area of the blade to protect all portions of the blade external surface.

Where, however, the coolant efflux passages are exposed to different gas stream static pressures and fed by a common plenum chamber, such velocity and flow rate control is difficult to achieve. One solution which has been considered, with reference to the blade 24, is to increase the diameter of passages 54. However, while such expedient would contribute to a reduced coolant efflux velocity, other factors being constant, the increased orifice area at the chamber 42 side of passage 54 would result in an excessive and undesirable coolant flow rate. Another solution considered is to provide outwardly tapered cooling holes with the small metering orifice at the plenum chamber 42 side of passage 54 providing reduced flow rate and the enlarged tapered or diffuser portion of the passage providing reduced coolant efflux velocity. This latter expedient, however, suffers from the disadvantage that with a tapered hole, the size or area of the metering orifice will vary as the square of the blade sidewall or skin thickness. Accordingly, any minor variation in blade wall thickness would result in substantial variation in the tapered hole inlet or metering orifice area which, in turn, would result in undesirable coolant flow rate variations.

With reference to FIGS. 3 and 5 the subject invention provides coolant efflux passages 54 through the blade skin or sidewall 55 which have first and second coaxial portions 62 and 64 respectively. The cross-sectional areas of portions 62 and 64, normal to the flow of cooling media therethrough, are preferably generally uniform and circular although it should be understood that other shaped such as elliptical, rectangular or the like may be used. The smaller diameter passageway portion 62 is appropriately sized to provide the desired volumetric rate of fluid flow through the passage 54 while the enlarged diameter portion 64 serves to create a diffusion section effective to reduce the efflux velocity of the cooling fluid to the desired level.

Preferably the corners 66 at the plenum chamber 42 side of passage portion 62 are sharp edged so as to cause a vena contracta to be formed within passage 54. By providing the enlarged passage portion 64, conditions are favorable for a shock wave to form downstream of the vena contracta which reduces the total pressure at the exit of the larger diameter passage portion 64 and thereby reduces the coolant efflux velocity. For well rounded entrance corners 66, entrance at an acute angle and/or sharp edge corners operating below a specific pressure ratio, the total pressure reduction is created by subsonic diffusion of the coolant air in passage 54. In either case, a substantial reduction in ejection or efflux velocity occurs which markedly improves the film cooling effectiveness.

The coolant efflux passage 54 may be readily and economically formed by first forming a passage having the desired cross section of passage portion 62 completely through the side wall 60 and then counter boring along the same axis a substantial distance within the side wall 60, but not through the plenum chamber 42, to the desired cross section of the larger diameter passage portion 64.

Passages 50, 52 are preferably circular and axially uniform in cross section and may be conveniently formed in the same manner as portion 62 of passage 54 by any one of a variety of well known processes.

To provide additional convection cooling area as well as increased axial length of the enlarged diffuser passage portion 64, the passage 54 may be inclined in a radial direction as well as in the chordal direction.

Although the blade 24 has been shown as having one radial row of coolant efflux passages 54, it should be understood that more than one row may be utilized with the passages 54 of such multiple rows in chordal alinement or alternately staggered.

Furthermore, while the cooling passage arrangement of this invention is particularly effective in providing improved film cooling of the convex surface of a turbine blade, it will be appreciated that such arrangement may also be employed in other areas of the turbine blade as well as in the turbine nozzle vanes 20 or other structural member having surfaces exposed to elevated temperatures.

From the foregoing, it will be appreciated that this invention provides means whereby film cooling effectiveness is enhanced for structures having external surfaces exposed to a high temperature environment and different static pressures and wherein the film cooling media is to be derived from a common plenum chamber.

We claim:

1. In a structural member of a gas turbine engine having at least one external surface exposed to a high temperature source, a first plenum chamber for containment of a cooling media at a predetermined pressure, first and second means for delivery of said cooling media to said external surface, with said first means exposed to a lower static pressure, externally of said structural member, than said second means, the improvement comprising: said first means comprising at least one passageway having a first portion adjacent said first plenum chamber and a second portion adjacent said external surface, said first portion having a cross-sectional area normal to the direction of cooling media flow therethrough sized to establish a predetermined cooling media flow rate and said second portion being larger in cross section that said first portion and sized to reduce the efflux velocity of said cooling media whereby high film cooling effectiveness is obtained.

2. The improved structure of claim 1 further characterized in that said first portion of said passageway is substantially uniform and circular in cross section.

3. The improved structure of claim 1 further characterized in that said second portion of said passageway is substantially uniform and circular in cross section.

4. The improved structure of claim 1 further characterized in that said passageway is inclined relative to said external surface.

5. The improved structure of claim 1 further characterized in that said plenum chamber is carried by said structural member.

6. The improved structure of claim 1 further characterized in that said structural member is defined, in part, by a leading edge, a trailing edge and convex and concave exterior surfaces extending therebetween, said first plenum chamber being carried by said structural member adjacent the leading edge thereof, with said passageway adapted to deliver said cooling media from said first plenum chamber to said convex surface and said second means adapted to deliver said cooling media remotely of said convex surface.

7. The improved structure of claim 6 further characterized by and including a plurality of said passageways arranged in at least one row traversing said convex surface.

8. The improved structure of claim 6 further characterized in that said second means comprise a plurality of passages, of generally uniform cross section, said passages arranged in at least one row traversing at least one of said leading edge and said concave surface.

9. The improved structure of claim 6 further characterized by and including a second plenum chamber carried by said structural member in spaced relationship to said first plenum chamber, means for delivery of said cooling media from said second plenum chamber to said first plenum chamber, whereby said cooling media is impinged against the wall forming surface of said first plenum chamber and said predetermined pressure is established.